Oct. 25, 1938.  H. J. SAUER  2,134,289
SWITCH DEVICE FOR AUTOMOBILE DIRECTION SIGNALS
Filed Aug. 18, 1936
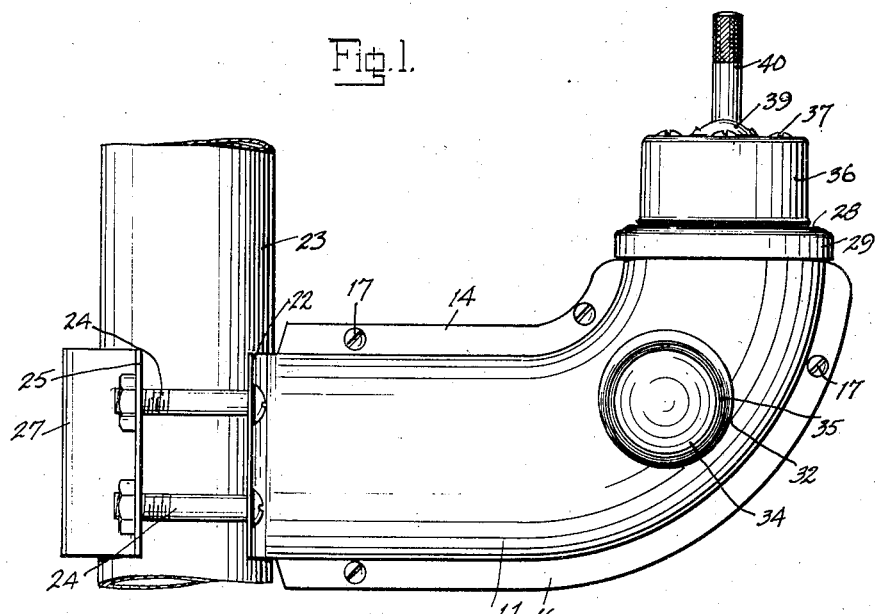
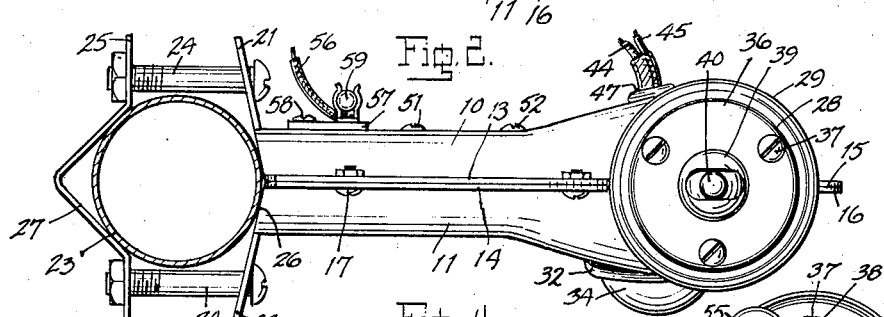
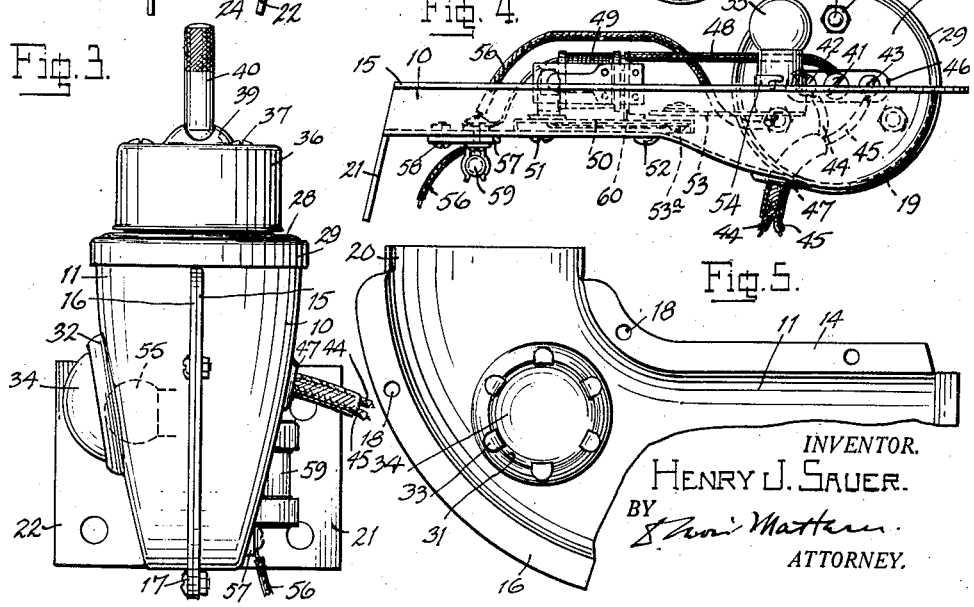
INVENTOR.
HENRY J. SAUER.
BY
ATTORNEY.

Patented Oct. 25, 1938

2,134,289

UNITED STATES PATENT OFFICE 2,134,289

SWITCH DEVICE FOR AUTOMOBILE DIRECTION SIGNALS

Henry J. Sauer, Fairfield, Conn., assignor to The Kilborn-Sauer Company, Fairfield, Conn., a corporation of Connecticut Application August 18, 1936, Serial No. 96,569

3 Claims. (Cl. 177—311)

The present invention relates to a switch device for automobile direction signals, and has for an object to provide a switch device adapted to be mounted upon the steering post of the automobile, and which will be of simple and sturdy construction and will reliably protect the parts against tampering with. A further object is to provide such parts of the switch as may from time to time have to be renewed in an easily accessible location, so that these parts may be readily renewed without the necessity of completely opening the casing, and without the danger heretofore encountered of damaging other parts of the switch in attempting to remove and install the renewable parts. It is particularly proposed to provide a renewable fuse disposed upon the outer side of the switch so that is may be easily renewed, and to provide a pilot lamp for the purpose of indicating when the switch is in operation in relation to a lens opening of sufficient size to permit the bulb to be removed and replaced simply by removing the lens.

Another object is to provide a switch in which the casing comprises a pair of casing members, one of which contains and supports all of the mechanism of the switch while the other member constitutes a cover and also a support for the pilot lamp lens. The manufacture, assembly, installation and servicing of the switch is thereby greatly facilitated.

With the above and other objects in view, an embodiment of the invention is shown in the accompanying drawings and this embodiment will be hereinafter more fully described with reference thereto and the invention will be finally pointed out in the claims.

In the drawings:

Fig. 1 is a side elevation of a switch device according to my invention showing the same mounted upon an automobile steering post.

Fig. 2 is a plan view, the steering post being shown in horizontal section.

Fig. 3 is an end elevation of the device, removed from the post.

Fig. 4 is a bottom plan view of one of the members of the casing upon which the operating parts of the switch are mounted.

Fig. 5 is a fragmentary inside elevation of the other member of the casing, and which constitutes a cover for the member shown in Fig. 4.

Similar reference characters indicate corresponding parts throughout the several figures of the drawings.

Referring to the drawings the switch device, according to the illustrated exemplary embodiment of the invention shown therein, comprises a pair of sheet metal casing members 10 and 11, these members being of substantially the same form and respectively provided with upper edge flanges 13 and 14 and lower edge flanges 15 and 16, which in the assembled relation of the switch are secured together by bolts and nuts 17 engaged through holes 18 in the flanges. The casing thus provided is of rectangular cross section along its horizontal portion and is curved upwardly at its outer end to a circular end portion disposed in a horizontal plane and formed by semi-circular flanges 19 and 20 at the forward ends of the respective members 10 and 11.

The members 10 and 11 are respectively provided at their rearward ends with outwardly bent ears 21 and 22 for the purpose of clamping the switch upon the steering post 23 by means of bolts and nuts 24 engaged through the ears 22 and 23 and through a clamping plate 25, the rearward end of the casing being slightly V-shape as at 26 and the plate 25 having a V-shape bend 27, so that the casing will clamp firmly upon the cylindrical surface of the post, irrespective of its diameter.

The forward end of the casing is closed by a circular switch mounting plate 28 having a downwardly bent rim flange 29 which is permanently connected to the inner circular flange 19 of the casing member 10 by spot welding, or in any other suitable manner. In assembling the cover member 11 its flange 20 is first fitted into the flange 29 and then secured in place by the bolts and nuts 17.

The cover member 11 is provided near its forward end with a circular counter-sunk opening 31 in which is secured a lens supporting rim 32, this rim being conveniently attached by inwardly projecting lugs 33 thereon engaged in the opening 31 and bent outwardly upon the inner surface of the member 11, as shown in Fig. 6. The lens 34 is removably engaged in the rim and is retained thereon by a split spring rim 35 which may be easily disengaged so that the lens may be removed. This opening 31 is of sufficient size to enable the pilot light bulb, hereinafter more fully referred to, to be removed and replaced when necessary without disturbing any of the other parts of the structure.

Upon the plate 28 a toggle switch is mounted, consisting of a cup shaped casing 36 in which is contained the switch mechanism, of the single pole double throw type and which may be of any suitable well known type, the same being secured by bolts 37 engaged downwardly, nuts 38 screwed upon the lower ends of the bolts 37 at the under side of the plate 28.

The upper wall of the casing 39 is provided with a slotted and dome-shaped bearing portion 39 in which is engaged the lower ball-shaped end of the toggle switch lever 40. The single pole double throw switch as shown has three contacts, i. e. a center contact 41 and contacts 42 and 43 at each side thereof, the center contact 41 being for the purpose of controlling a pilot light relay, and the contacts 42 and 43 being for the right and left signal lamps, the switch being such that the circuit of the pilot lamp is completed when either the circuit of the right or left signal lamp is completed.

As the switch is intended to control the lighting of right or left signal lamps disposed at the rear of the automobile, it will preferably be so connected to the lamps that the left lamp will be lighted when the switch lever is moved to the left, and the right lamp will be lighted as the switch lever is moved to the right.

The contact members 42 and 43 are connected to lead wires 44 and 45 preferably in the form of a double strand cable which extends downwardly in the casing through a slot 46 provided in the plate 28 and outwardly through a bushed opening 47 in the side wall of the casing member 10, the wire 59 being connected to the right signal lamp and the wire 45 being connected to the left signal lamp. The central contact member 41 is connected by a lead wire 48 to the coil 49 of a pilot lamp lighting relay device, the base plate 50 of which is secured interiorly to the member 10 by bolts and nuts 51 and 52.

Upon the plate 50 the pilot lamp supporting arm 53 formed of conducting metal is secured by a screw 53ª.

The lamp socket 54 is mounted upon the conducting arm 53 in such manner that one side of the lamp bulb 55 is grounded to the arm 53, so that upon energizing of the relay coil the pilot lamp has its ground side connected with the grounded structure of the switch, and as the other side of the bulb is connected to the battery through a lead wire 56 it is lighted whenever the coil of the relay is energized, and which takes place upon lighting of one or the other of the signal lamps.

Upon the outer side of the casing member 10 upon an insulating mounting plate 57 secured by nuts and bolts 58 there is provided a removable fuse 59 interposed in the lead wire 56 of the pilot lamp. It will be understood that the signal lamps are grounded at one side, that the battery is grounded at one side, and that the relay is grounded at one side through a grounded bracket 60.

The switch according to my invention is of sturdy and economical construction and completely protects the working parts against damage and tampering, while permitting convenient renewal of the fuse and pilot lamp bulb should these burn out.

I have illustrated and described a preferred and satisfactory embodiment of my invention, but it will be understood that changes may be made therein, within the spirit and scope thereof as defined in the appended claims.

Having thus described my invention what I claim and desire to secure by Letters Patent is:—

1. In a signal lamp control switch, a hollow arm comprising a pair of opposed casing members of channel form each having longitudinal edge flanges disposed in a plane and removably secured together, one of said members constituting a switch supporting member and the other a cover member, said members when secured together constituting an open-ended tube, and a switch element secured to said supporting member and closing one end of said arm.

2. In a signal lamp control switch, a hollow arm comprising a pair of opposed casing members of channel form each having longitudinal edge flanges disposed in a plane and removably secured together, one of said members constituting a mechanism supporting member and the other a cover member, said members when secured together constituting an open-ended tube, a switch element secured to said supporting member and closing one end of said arm, a pilot lamp secured interiorly to said supporting member at a point opposed to said cover member, said cover member having an opening aligned with said pilot lamp and a removable lens mounted in said opening, said opening being of sufficient size to insert or remove the pilot lamp therethrough.

3. In a signal lamp control switch, a hollow arm comprising a pair of substantially symmetrical opposed casing members of channel form each having longitudinal edge flanges disposed in a plane and removably secured together, one of said members constituting a mechanism supporting member and the other a cover member, said members when secured together constituting an open-ended tube, and a switch element supporting cap fixedly secured to one end of said supporting member, and removably engaged by one end of said cover member to form a closure for one end of said arm.

HENRY J. SAUER.